Sept. 2, 1958 E. J. McCLOSKEY 2,849,886
ADJUSTABLE SHEAVES
Filed May 29, 1956 2 Sheets-Sheet 1
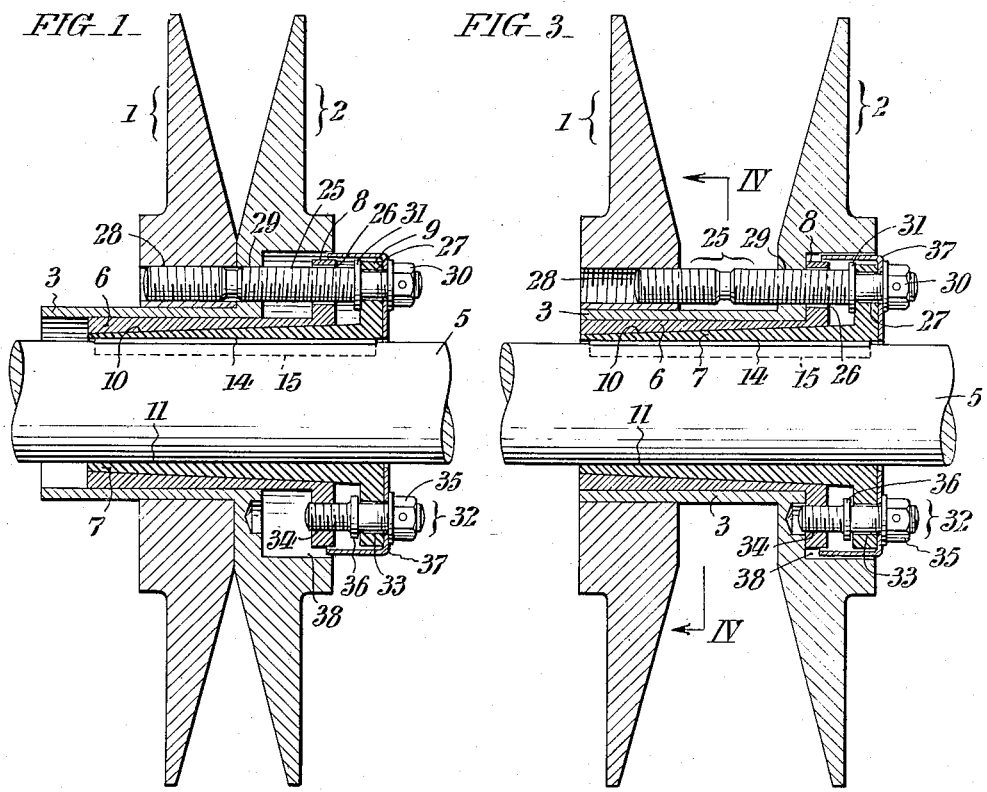
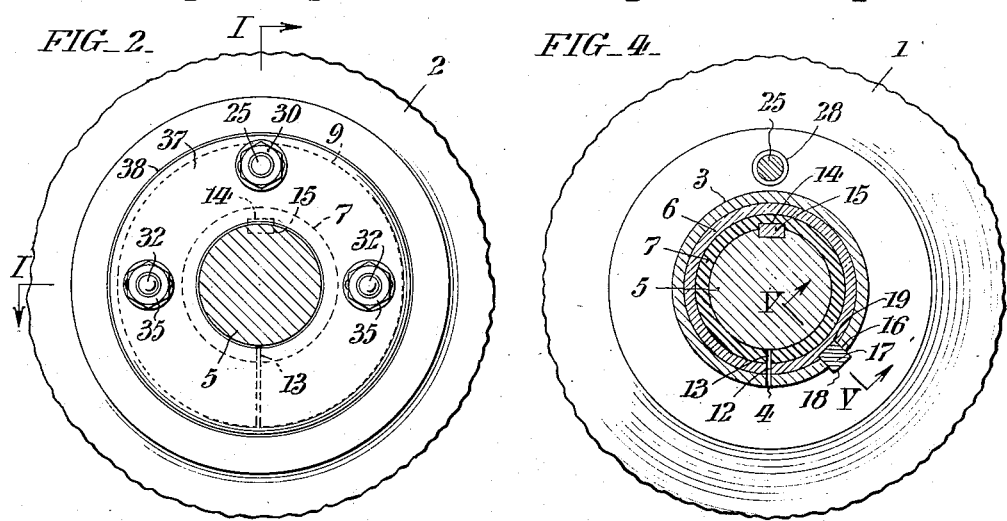
INVENTOR:
Ellsworth J. McCloskey,
BY Paul & Paul
ATTORNEYS Sept. 2, 1958   E. J. McCLOSKEY   2,849,886
ADJUSTABLE SHEAVES
Filed May 29, 1956   2 Sheets-Sheet 2
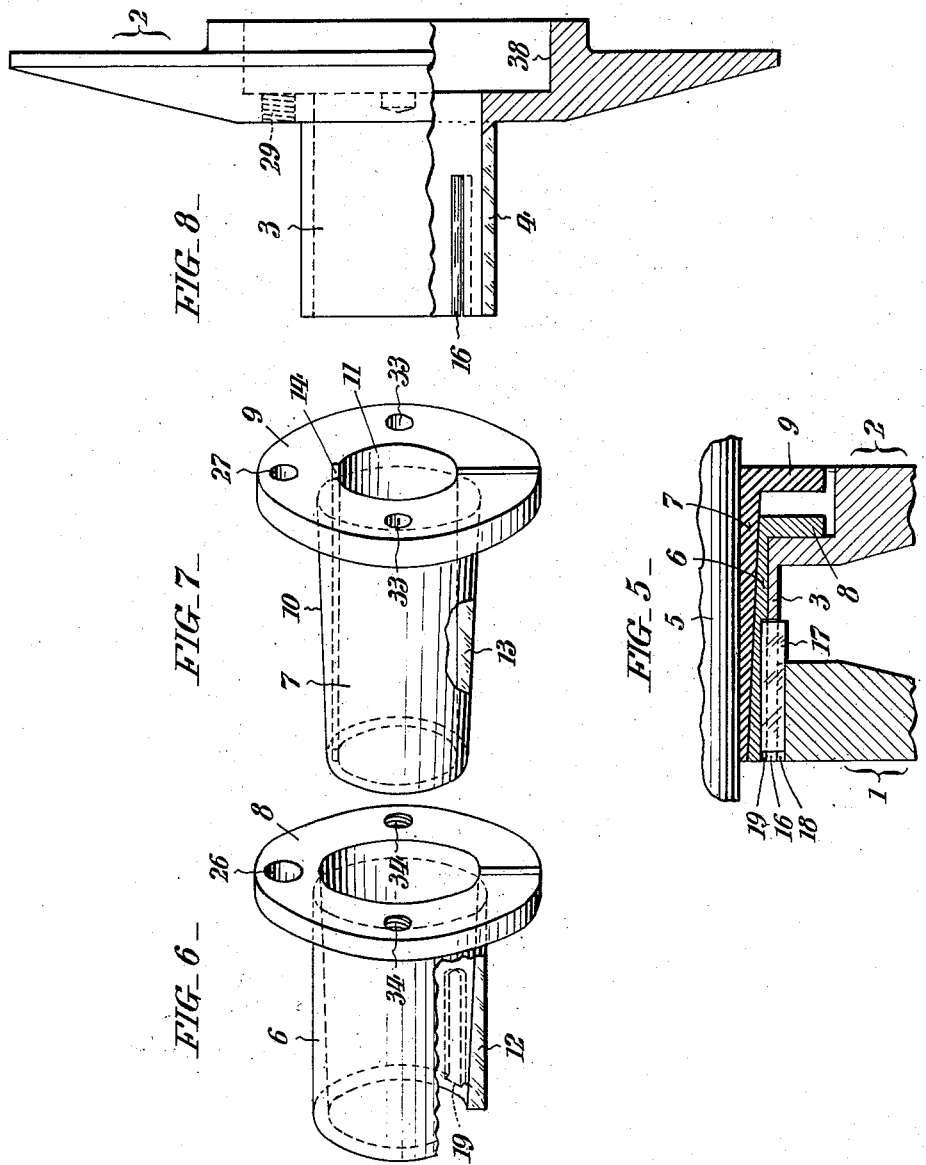
INVENTOR:
Ellsworth J. McCloskey,
BY Paul & Paul
ATTORNEYS

United States Patent Office 2,849,886
Patented Sept. 2, 1958

2,849,886

ADJUSTABLE SHEAVES

Ellsworth J. McCloskey, Norristown, Pa., assignor to The American Pulley Company, Philadelphia, Pa., a corporation of Pennsylvania Application May 29, 1956, Serial No. 588,151

3 Claims. (Cl. 74—230.17)

This invention relates to adjustable sheaves.

My invention has for its chief aim to provide a sheave of the kind referred to which is of simple and compact construction; which is easily adjusted; which is immune against derangement in adjusted positions; and which, withal, lends itself to economical production in quantity.

Other objects and attendant advantages will appear from the following detailed description of the attached drawings, wherein:

Fig. 1 is a staggered axial section of a sheave conveniently embodying the present improvements, the section being taken as indicated by the angled arrows I—I in Fig. 2.

Fig. 2 is a fragmentary view of the sheave in side elevation as seen from the right of Fig. 1.

Fig. 3 is a view corresponding to Fig. 1 showing the sheave differently adjusted.

Fig. 4 is a fragmentary view in cross section taken as indicated by the angled arrows IV—IV in Fig. 3.

Fig. 5 is a fragmentary detailed section taken as indicated by the angled arrows V—V in Fig. 4.

Figs. 6 and 7 are perspective views of different parts of the sheave hereinafter particularly referred to.

Fig. 8 is a view, partly in elevation and partly in section, of one of the flange disks of the sheave.

With more specific reference to these illustrations, the numerals 1 and 2 respectively designate the opposing beveled belt engaging disk components of the sheave. As shown, the disk component 2 has a hollow axial hub extension 3 at the beveled side thereof which is longitudinally split as at 4 (see Figs. 4 and 8); and the disk component 1 is axially bored to slidingly fit about the hub extension 3 of the hub component 2. Interposed between the hub extension 3 of the disk component 2 and the shaft 5 whereon the sheave is mounted, are a bushing 6 and an interengaged sleeve which, respectively, have circumferential flanges 8 and 9 at corresponding ends. The sleeve 6 is taperingly bored inwardly from the end opposite that occupied by the flange 8, and the outer surface of the bushing 7 is tapered externally as at 10 to fit within the bore of the sleeve 6, the bore 11 of the bushing 7 being cylindrical at 11 and of a diameter corresponding to that of the shaft 5. The sleeve 6 and the bushing 7 are both split throughout their lengths as at 12 and 13 respectively in Figs. 6 and 7, and the bushing 7 is provided internally with a longitudinal groove 14 for engagement by a key 15 on the shaft 5 (Figs. 1–4 and 7). It will be noted moreover, that the hub 3 of the disk component 2 is provided through about half its length with a longitudinal slot (Fig. 8) for lodgment of a spline 17 which engages key ways 18 and 19 respectively in the hub bore of the disk component 1 and in the outer surface of the sleeve 6 as shown in Figs. 4 and 5.

For the purpose of adjusting the sheave there is provided, in accordance with my invention, a screw 25 which, see Figs. 1 and 3, passes freely through aligned apertures 26 and 27 respectively in the flanges 8 and 9 of the sleeve 6 and the bushing 7, and it has oppositely pitched threaded portions which respectively engage correspondingly tapped axially aligned holes 28 and 29 in the disk components 1 and 2. As further shown, the adjusting screw element 25 is constrained against axial movement relative to the flange 9 of the wedge sleeve 7 by a polygonal end head 30 and a collar 31 spaced from said head by the thickness of said flange.

To prevent displacement of the flange components 1 and 2 after adjustment, I have additionally provided a pair of locking screws 32 which pass freely through holes 33 in the flange 9 of the bushing 7 at points respectively disposed in quadrant relation to the adjusting screw 25, and which are threadedly engaged into correspondingly tapped aligned holes 34 in the flange 8 of the sleeve 6.

Like the adjusting screw element 25, the locking screws 32 are constrained against axial movement relative to the flange of the bushing 7, by polygonal end heads 35 and stop collars 36 which respectively abut opposite faces of said flange. A cup like shroud 37 surrounds the flanges 8 and 9 of the sleeve 6 and the bushing 7 to prevent entry and accumulation of dirt, said shroud being suitably apertured for passage through the back thereof of the screws 25 and 32 and being held in assembly by the heads 30 and 35 of said screws. At its outer side the disk component 2 is axially counterbored as at 38 to clear the shroud 37 when the two disk components are laterally spaced to the maximum extent, as in Fig. 4.

To adjust the sheave, the locking screws 32 are backed off by clockwise rotation in Fig. 1, contrary axial shifting of the sleeve 6 and the bushing 7 to ease the binding effect of the sleeve upon the hub 3 of the disk component 2. With this accomplished, the adjusting screw 25 is rotated clockwise in Fig. 1 whereby, through the action of its oppositely pitched threaded portions, the disk components are moved axially away from each other to increase the gap between them. After the desired adjustment is attained, the disk components 1 and 2 are secured against relative displacement by drawing up the locking screws 32 as a consequence of which the sleeve 6 and the bushing 7 are axially shifted contrariwise to circumferentially expand the split hub 3 of the disk component 2 by their combined wedging action in a manner readily understood from Figs. 1 and 3. Binding of the screws 25 and 28 is prevented by the spline 17 through which the disk component 2, the sleeve 6 and the bushing 7 are restricted to axial movement relative to each other during adjustment of the sheave.

While the preferred embodiment of this invention has been described in some detail, it will be obvious to one skilled in the art that various modifications may be made without departing from the invention as hereinafter claimed.

Having thus described my invention, I claim:

1. In an adjustable sheave, a disk component having a beveled belt-engaging face and an elongate axial bored hub projection extending from the beveled face, the bore of the hub being counterbored to provide an annular recess in the back face of said component; a mating disk component, with a beveled belt-engaging face confronting that of the first mentioned component, axially bored to slidingly fit over the hub of the first mentioned component; a longitudinally-split tapered bushing with an axial bore to fit about a shaft whereon the sheave is mounted, having a circumferential flange at one end thereof; a sleeve counter-tapered internally to fit over the bushing and having a cylindrical outer surface to fit into the hub of the first mentioned disk component and a circumferential flange at one end thereof positioned in the assembly, inwardly adjacent the flange on the bushing at the counterbored side of the first mentioned disk component; and an adjusting screw constrained to rotation in the flange of the bushing, said screw passing freely through a clearance aperture in the flange of the sleeve and having oppositely threaded portions engaged in corerspondingly-tapped holes in the respective disk components whereby, upon turning the screw in one direction, said components are adjusted toward each other, and whereby, upon turning the screw in the opposite direction, said components are adjusted away from each other incident to which the flanges on the bushing and the sleeve are eventually accommodated wholly within the counterbore of the first mentioned component.

2. An adjustable sheave according to claim 1, further including at least one locking screw circumferentially spaced from the adjusting screw, said locking screw being likewise constrained to rotation in the flange of the bushing but threadedly engaged into the flange of the sleeve.

3. An adjustable sheave according to claim 1, wherein a cup-like protective shroud is secured over the flange of the bushing and extends peripherally about the flange of the sleeve.

References Cited in the file of this patent

UNITED STATES PATENTS

| | | |
|---|---|---|
| 2,611,278 | Turnbull | Sept. 23, 1952 |
| 2,651,209 | Williams | Sept. 8, 1953 |